L. B. STANLEY.
TROLLEY RETRACTOR.
APPLICATION FILED MAR. 19, 1909.
978,953.
Patented Dec. 20, 1910.
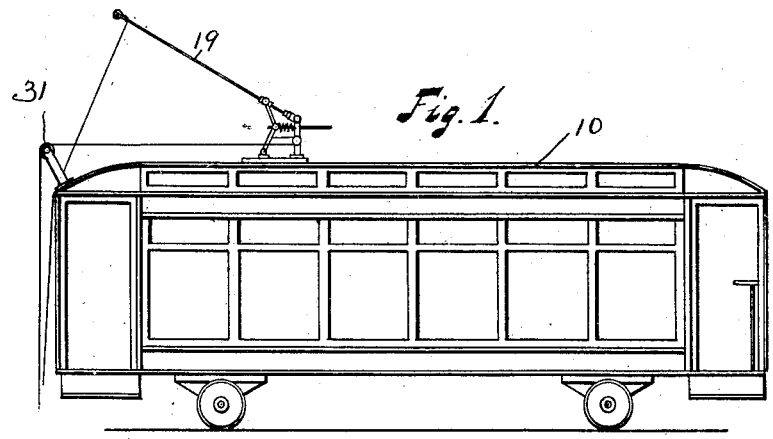
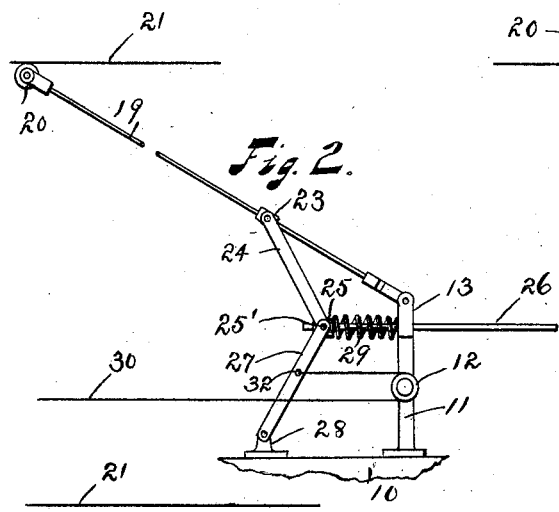
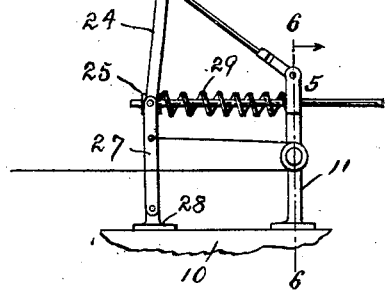
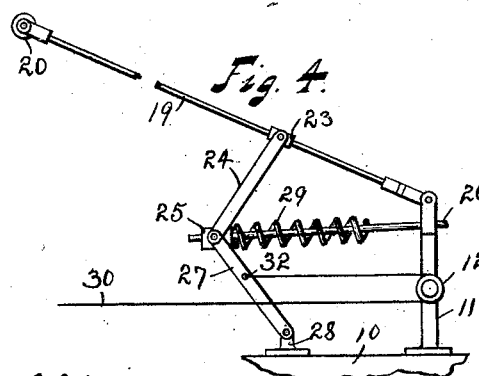
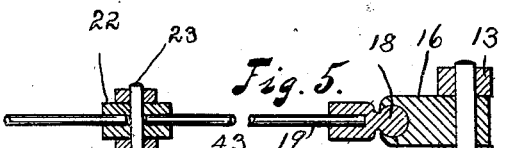
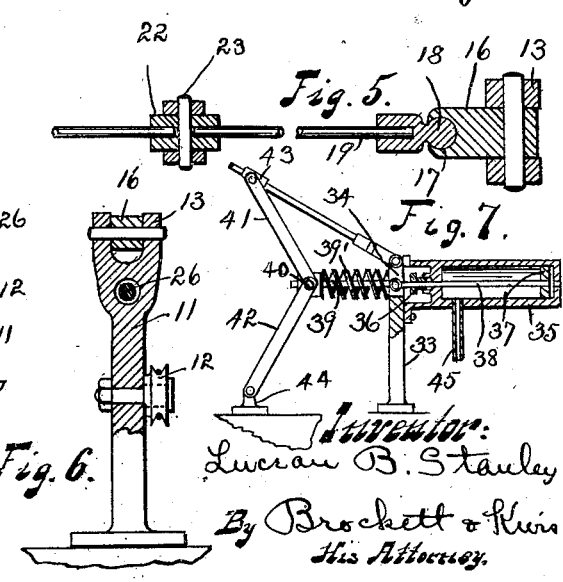
Witnesses:
Edw. Lindmueller.
C. H. Tresch.
Inventor:
Lucian B. Stanley
By Brockett & Kivis
His Attorney.

UNITED STATES PATENT OFFICE.

LUCEAN B. STANLEY, OF COLLINWOOD, OHIO.

TROLLEY-RETRACTOR.

978,953.   Specification of Letters Patent.   Patented Dec. 20, 1910.

Application filed March 19, 1909. Serial No. 484,561.

*To all whom it may concern:*

Be it known that I, LUCEAN B. STANLEY, a citizen of the United States, residing at Collinwood, in the county of Cuyahoga and State of Ohio, have invented certain new and useful Improvements in Trolley-Retractors, of which the following is a specification.

This invention relates generally to trolley retractors and is designed particularly as an improvement over devices of that sort now in use and is of a character such that it eliminates to a considerable extent all chances of the trolley doing any damage before it is drawn down upon the top of the car.

More specifically the invention relates to a device wherein a spring acting upon the joint of a pair of toggles is adapted to force the trolley against the wire and when the former leaves the latter, to retract the trolley and pull it down out of danger upon the top of the car.

Still more specifically the invention relates to a suitable support having the trolley pole swiveled thereto and suitable toggle arms one of the free ends of which is secured to the top of the car, and the other is secured to the trolley pole, together with a spring adapted to bear against the joint of the toggles, when they are shifted in one direction, and to force the trolley wheel against the wire and to bear upon the same point when the trolley moves up from the wire and throw the toggles past the center, thus permitting the trolley to drop onto the top of the coach or car.

Further invention resides in certain features set forth in the following description, drawings and claims.

Referring to the drawings, Figure 1 is a side elevation of a car provided with my improved device; Fig. 2 is an enlarged view of the trolley with my improved mechanism applied thereto; Fig. 3 is a similar view showing the trolley as it has jumped from the wire; Fig. 4 is a similar view showing the trolley retracted; Fig. 5 is a top plan view partially in section showing the mounting of the trolley pole in the support; Fig. 6 is an elevation partly in section of the support; and Fig. 7 is a modified form of my improved retracting mechanism and showing a pneumatic device for resetting the mechanism.

In carrying out my invention any preferred form and construction of parts may be employed provided they possess the necessary characteristics, but I have shown one form in the drawings which meets the requirements with great efficiency, and in such embodiment 10 represents the top of the car to which is secured a suitable support 11 provided with a grooved roller 12 and a forked or bifurcated end 13 in which is pivoted a member 16. This member 16 is provided with a socket 17 opening out at the end of the member 16 and receiving a rounded portion 18 secured to the end of the trolley pole 19 which is provided with the usual trolley wheel and harp 20 coöperating with the trolley wire 21.

Secured at some point upon the trolley pole is a block 22 provided with an opening for receiving a pin 23 passing through the ends of a pair of toggle links 24 which, at their opposite ends, are pivoted to a block 25 rigidly secured to a rod 26 which is guided and passes loosely through an opening in the support 11. The trolley pole is divided at the block 22 to permit the pin 23 to pass through the center of the block and the parts of the pole are secured in the openings in the block 22 by welding or by any other suitable means. Pivotally secured to the pin 25' is another pair of toggle links 27 pivotally secured at their lower ends to a bracket 28 fastened upon the top of the car.

Surrounding the rod 26 is a spring 29 interposed between the block 25 and the support 11 and arranged in a manner such that when the pairs of toggle links are broken to the right, as shown in Figs. 1 and 2, or when they are broken in the direction of the support 11, the spring 29 is under tension and this tension through these toggles is brought to bear upon the trolley pole to force its wheel against the trolley wire, but when the trolley leaves the wire and moves upward, the toggle is straightened, and the tension of the spring breaks them toward the left, as shown in Fig. 4, so that the trolley drops down toward the top of the car and is retracted so that it may do no damage.

In order to reset the trolley or to raise it toward the wire a rope or cable 30 is provided, and this cable passes up over a suitable pulley 31 secured to the top of the car, preferably at the rear, thence forward around the grooved wheel 12 and is secured in an opening 32 in the toggle links 27.

In operation the trolley retracting mechanism is in the position shown in Figs. 1 and 2, but upon the trolley leaving the wire, the tension of the spring 29 causes the toggle mechanism to straighten and pass to the left beyond the straight line position when the trolley pole will drop upon the top of the car. The conductor or operator then grasps the usual trolley rope to guide the trolley laterally, raises the trolley by pulling upon the rope 30 which, through the arrangement just described, draws the toggle links back into initial position against the tension of the spring 29 when after the trolley wheel has been placed under the wire, the rope 30 is released and the spring 29 is free to cause the trolley to bear up against the wire.

The resetting rope already described is a very simple mode of resetting the trolley, but I prefer to utilize the mechanism shown in Fig. 7 wherein a support 33 is provided with an enlarged opening 34 and a compressed air cylinder 35 having a stuffing box 36, a piston 37 and piston rod 38 which has swiveled to its end a link 39 connected to the pivotal point 40 of the toggle links 41 and 42 which are connected to the trolley pole 43 and a bracket 44 on top of the car in a similar manner to the other construction. A suitable supply pipe 45 is provided on the left end of the cylinder and controlled by suitable valve mechanism not shown by the conductor or operator. In operation the normal position of the toggles and trolley is the same as that described in connection with the other construction, but upon the trolley leaving the wire, the piston is drawn by the spring 39' to the left and in the resetting compressed air is admitted to the left end of the cylinder 35 through the supply pipe 45 when the piston through its rod and the link 39 will pull the toggle links to the right, and when the trolley wheel is adjusted under the wire, the air is then released from the cylinder by the operator, and the spring is free to force the trolley wheel against the trolley wire in a well known manner.

In all instances the manipulation of the trolley pole laterally is permitted by the joint formed by the socket 17 and the rounded portion 18.

Having described my invention, I claim:—

1. In a trolley pole structure, a trolley support, a trolley pole swiveled thereto, toggle links pivotally connected to the pole and to a fixed part, suitable means adapted to bear against the joint of the toggles to cause them when in one position to force the trolley toward the wire and upon the release of the trolley to assume another position and cause the trolley to drop upon the car, and means engaging the toggle links for returning them to the initial position for forcing the trolley against the wire.

2. The combination with a car, of a trolley support, a trolley pole swiveled thereto, toggle links connected to the top of the car and directly to the trolley pole intermediate its ends, a rod guided in the support and connected to the joint of said toggle links, and means for forcing the joint of the toggle links in a direction to cause the toggle arms to force the wheel in engagement with the trolley wire and when the wheel leaves such wire to cause the trolley pole to drop upon the top of the car, and means for resetting the trolley.

3. The combination with a car, of a trolley support, a trolley pole swiveled to said support, a trolley wheel carried by said trolley pole, a toggle link secured to said trolley pole intermediate its ends, another toggle link secured to the top of the car, said toggle links being pivoted together, a rod secured to the pivotal point of the toggle links and guided in the trolley support, a spring between the pivotal point of said toggle links and the trolley support and adapted to have a tendency toward shifting said toggle links in a direction to cause the trolley wheel to engage the wire when said toggle links are in one position and upon the trolley wheel leaving the wire to cause said toggle links to move into another position and pull the trolley down toward the top of the car, and means for resetting the trolley.

4. The combination with a car, of a trolley support, a trolley pole swiveled in said support, a trolley wheel carried by said trolley pole, toggle links pivoted together and having their ends connected, one with the trolley pole and the other with the top of the car, means normally tending to shift said toggle links in a direction such that when the trolley wheel is upon the wire it is normally held in such position by such means, but when the trolley pole leaves the wire it normally tends to pull the trolley pole down toward the car, and a suitable motor for resetting said trolley pole.

5. The combination with a car, of a trolley support, a trolley pole swiveled in said support, a trolley wheel carried by said trolley pole, toggle links pivoted together and having their ends connected, one with the trolley pole and the other secured to the top of the car, means normally tending to shift said toggle links in a direction such that when the trolley wheel is upon the wire it is normally held in such position by such means, but when the trolley pole leaves the wire it normally tends to pull the trolley pole down toward the car, and a pneumatic cylinder carried by said support and provided with a piston and piston rod, connections between said rod and said toggle links whereby the trolley may be reset by shifting the toggle links.

6. The combination with a car, of a trolley support, a trolley pole swiveled in said support, a trolley wheel carried by said trolley pole, toggle links pivoted together and having their ends connected, one with the trolley pole and the other secured to the top of the car, means normally tending to shift said toggle links in a direction such that when the trolley wheel is upon the wire it is normally held in such position by such means, but when the trolley pole leaves the wire it normally tends to pull the trolley pole down toward the car, a pneumatic cylinder carried by said support, a piston therein, a piston rod, a link connecting the end of said piston rod and the pivotal point of the toggle links whereby upon the charging of air upon one side of the piston, said toggles are returned to normal position and the trolley may be reset.

In testimony whereof I affix my signature in presence of two witnesses.

LUCEAN B. STANLEY.

Witnesses:
C. H. TRESCH,
B. W. BROCKETT.